Aug. 9, 1960   J. B. HILDERBRAND   2,948,422
FLOOR CONSTRUCTION FOR A STORAGE STRUCTURE
Filed Nov. 28, 1958

INVENTOR.
JAMES B. HILDERBRAND
BY
Attorneys

United States Patent Office 2,948,422
Patented Aug. 9, 1960

2,948,422

FLOOR CONSTRUCTION FOR A STORAGE STRUCTURE

James B. Hilderbrand, Kankakee, Ill., assignor to A. O. Smith Corporation, Milwaukee, Wis., a corporation of New York Filed Nov. 28, 1958, Ser. No. 777,020

3 Claims. (Cl. 214—17)

This invention relates to a sealed storage structure and more particularly to a floor construction for a sealed storage structure having a bottom unloading mechanism.

Sealed storage structures or silos are frequently used to store food materials and due to the hermetically sealed nature of the structure, spoilage of the food material is maintained at a minimum. In a structure of this type, the material to be stored is generally introduced into the structure through the top and a mechanical unloading device is employed at the bottom of the structure to unload the same. One form of an unloader is shown in the patent to Julius Tiedemann 2,635,770. This unloading mechanism includes a rotating arm which is journaled at the center of the silo about a central drive post. The rotating arm is adapted to rotate about the floor of the silo and carries a cutter chain which travels in an endless path on the cutter arm. The cutter chain is adapted to cut or dislodge the stored material and convey the same to the center of the silo where it is discharged into a conveyor trough which is formed in the floor of the silo and extends radially from the center of the silo to the exterior. A conveyor unit is located within the conveyor trough and moves the dislodged material to the exterior of the silo.

The conveyor unit moves in an endless path within the trough and is provided with a series of paddles which engage and convey the stored material. The stored material is introduced into the central portion of the trough by the cutter arm and generally the conveyor paddles must move a portion of the material 180° around the inner end of the trough. When material, such as silage, is being unloaded, the silage tends to bind at the central portion of the trough where its direction is to be changed 180° by the conveyor paddles. This binding or jamming of the silage against the wall of the trough causes a considerable loss of power for the drive unit and also adversely affects the delivery rate of silage or other stored material.

The present invention is directed to a floor contruction adapted to improved the delivery of the stored material and to decrease the power requirements for the drive unit. The apparatus includes a pair of floor plates which are secured to the foundation of the silo and extend partially across the trough with the adjacent longitudinal edges of the plates being spaced apart. The first plate is disposed above the path of the conveyor paddles moving toward the inner end of the trough and covers the entire radial extent of the trough. The second plate is disposed above the path of the paddles moving away from the inner end of the trough and extends from midway of the length of the trough to the outer end of the trough, thereby leaving the inner portion of the trough open to receive the silage or other stored material.

The first floor plate covers the entry to the trough in the location where the silage would have to be moved 180° by the conveyor paddles. The shorter second floor plate permits the entry of the silage to the trough at a position where the silage need only be moved outwardly toward the exterior of the silo. This results in a better and more uniform delivery of silage or other stored material and decreases the power requirements for the drive unit.

Other objects and advantages will appear in the course of the following description.

The drawings illustrate the best mode presently contemplated of carrying out the invention.

Figure 1:
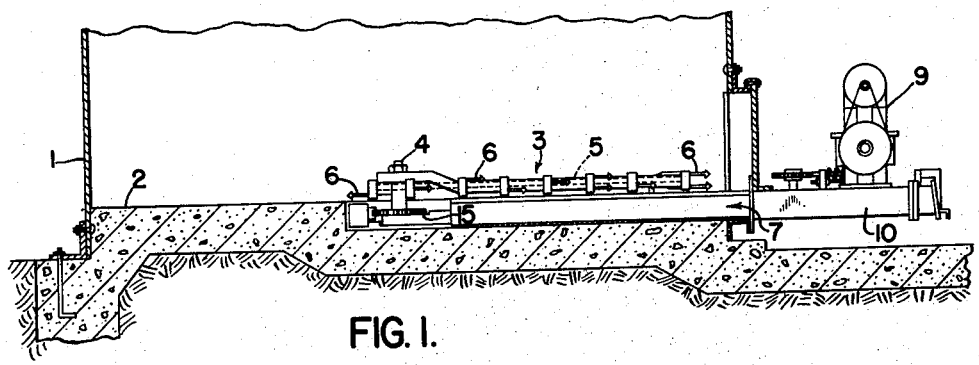
Figure 1 is a vertical section of a silo incorporating the present invention.
Figure 3:
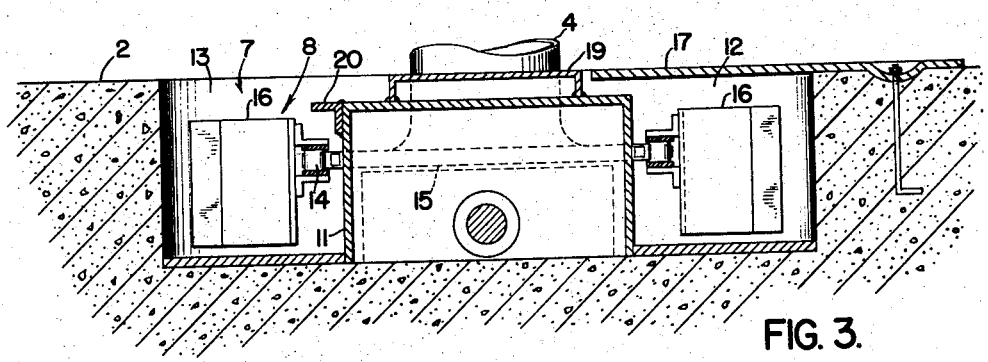
Fig. 3 is a transverse section taken through the trough in the foundation of the storage structure.
Figure 2:
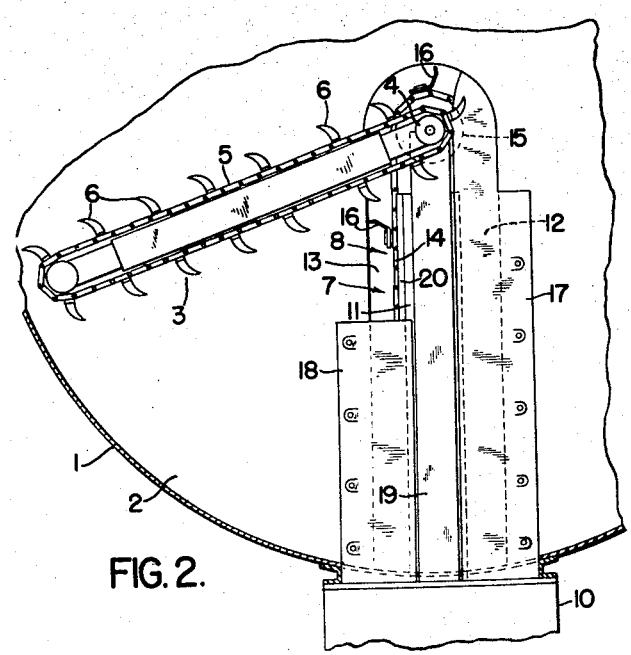
Fig. 2 is a horizontal section of the silo showing the floor construction.

The drawings illustrate a sealed storage structure or silo 1 which is supported on a foundation 2. The stored material is adapted to be unloaded or removed from the storage structure by means of a cutter arm 3 which is rotatably secured to central drive post 4 located at the center of the structure. The cutter arm 3 is adapted to rotate on the foundation 2 and carries a chain 5 which travels in an endless path about the arm as the arm is rotated.

The silage or other stored material is cut or dislodged by a series of teeth 6 which are secured at spaced intervals to the cutter chain 5. The teeth serve to dislodge the stored material and convey the same to a radially extending trough 7 which is formed in the foundation 2.

A conveyor unit 8 is located within the trough and serves to conduct the cut or dislodged stored material from the center of the trough to the exterior. The cutter arm 3, cutter chain 5 and conveyor unit 8 are driven by a drive unit 9 which is supported on the conveyor housing 10 located at the exterior of the storage structure.

The conveyor unit 8 comprises a base 11 which extends substantially the length of the trough and terminates at the central post 4. The side walls of the base 11 are spaced from the walls of the trough to provide a pair of channels 12 and 13 which provide a passage for an endless conveyor chain 14.

The endless chain 14 extends within the channels 12 and 13 and passes around a sprocket 15 which is journaled on the central post 4. The chain 14 is driven by a drive sprocket, not shown, which is operably connected to the drive unit 9.

The stored material within the trough 7 is conveyed to the exterior by a plurality of paddles 16 which are secured at spaced intervals to the endless chain 14. The paddles 16 move inwardly within channel 12 toward the inner end of the trough, then pass through 180° at the inner end of the trough and then travel through channel 13 to the exterior of the silo.

According to the invention, the channels 12 and 13 are covered by a pair of floor plates 17 and 18, which are secured to the foundation 2 by suitable bolts or the like. The upper surface of plates 17 and 18 are disposed substantially flush with the upper surface of the foundation 2 so that the cutter arm 3 may rotate freely over the foundation.

The inner longitudinal edges of plates 17 and 18 are spaced from each other and the space therebetween is closed off by a longitudinally extending hump 19 which is secured to the upper surface of base 11.

The plate 17 is disposed above the path of the conveyor paddles 16 which are moving toward the inner end of trough 7 and plate 17 covers substantially the entire radial extent of the trough, including the inner end of the trough. In contrast to this, the plate 18 is disposed above the path of the paddles 16 moving away from the inner end of the trough, and plate 18 extends from substantially the center of the length of the trough to the outer end of the trough. Approximately one-half of the inner end of the trough is thereby maintained open by use of the shorter plate 18 so that the silage or other stored material can have access to the trough 7. Thus, the shorter plate 18 permits entry to the trough at a position where the conveyor paddles are only moving outwardly toward the exterior of the silo, and the longer plate 17 prevents entry of the silage into the trough at a location where the silage would have to be moved 180° around the inner end of the trough by the paddles 16.

This results in a substantially more efficient delivery of the stored material to the exterior of the storage structure and reduces the power requirements for the conveyor unit 8.

The present invention is particularly useful when the cutter arm is passing through an eight o'clock position with respect to the trough. In this position, if the plates 17 and 18 were of the same length and extended inwardly to a position adjacent the post 4, the major portion of the cut silage would be deposited in the inner end of trough 7 in a location where the conveyor paddle 16 would have to move the silage through 180° around the inner end of the trough. If a substantial portion of silage is so deposited in the trough, the silage will jam and exert a substantial force against the wall of the trough, thereby increasing the power requirements for the conveyor 7. However in the present invention, the plate 17 covers the entire length of trough above the path of the conveyor paddles moving toward the inner end of the trough so that the silage or other stored material can only be deposited into the trough at a location where the conveyor paddles are moving outwardly toward the exterior of the structure.

As the plate 18 terminates a substantial distance from the chain supporting sprocket 15, an angle bar guide member 20 is secured to the base 11 and extends over the channel 13. The guide member 20 prevents the conveyor chain 14 from raising within the channel 13 and eliminates the possibility of the conveyor paddles 16 contacting or striking the inner edge of the plate 18.

The floor construction of the invention insures that the silage will be deposited into the trough at a location where the conveyor is moving in a constant direction, and this resultss in a more efficient and uniform delivery of silage and also decreases the power requirements for the conveyor.

Various modes of carrying out the invention are contemplated as being within the scope of the following claims particularly pointing out and distinctly claiming the subject matter which is regarded as the invention.

I claim:

1. A storage structure, comprising a foundation having a trough extending from the central portion of the foundation to the periphery thereof, a silo mounted on the foundation, a cutter arm rotatably mounted at the central portion of the foundation and disposed to rotate within the silo and cut the stored material and convey the same to the inner end of the trough, a plurality of conveyor members disposed within the trough and traveling in an endless path from the inner end of the trough to the exterior of the silo to convey the stored material to the exterior, a first fixed cover plate disposed above the path of the conveyor members moving from the exterior of the silo toward the inner end of the trough and extending substantially the entire length of said trough, and a second fixed cover plate disposed above the path of the conveyor members moving from the inner end of the trough to the exterior of the storage structure and extending from the outer end of the trough to a position substantially adjacent the longitudinal center of the trough to provide an entry to the trough at a location where said conveyor members are moving from the inner end of the trough to the exterior of the silo.

2. A storage structure, comprising a foundation having a trough extending from the central portion of the foundation to the periphery thereof, a generally cylindrical sealed vessel supported on the foundation and adapted to contain a stored material, a drive post mounted in the inner end of the trough and adapted to be rotated by a drive mechanism, a rotating cutter arm mounted on the drive post and disposed to rotate about the axis of said post, said cutter arm adapted to cut the stored material and convey the same to the inner end of the trough, a base member disposed within the trough and extending from said drive post to the outer end of said trough, said base member dividing said trough into a first and second longitudinal passage, a conveyor unit disposed within the trough and mounted to travel in an endless path within said passages to move the stored material from the inner end of the trough to the exterior of the structure, said conveyor unit having a series of conveyor members disposed to travel in an inward path toward the inner end of the trough in said first passage and then turning 180° and traveling in an outward path in said second passage from the inner end of the trough to the exterior of the structure, a first floor plate secured to the foundation and projecting laterally above said inward path of the conveyor members and extending substantially the entire length of said trough, and a second plate secured to the foundation and projecting laterally above said second passage and extending from the outer end of the trough to a position spaced inwardly from the inner end of the trough to provide an entry to the trough at a location where said conveyor members are moving from the inner end of the trough to the exterior of the structure.

3. In a sealed storage structure having a bottom unloading member for cutting the stored material and conducting the same to the inner end portion of a trough formed in the foundation of said storage structure, a base member disposed within the trough and dividing said trough into a first and second longitudinal extending passage, a plurality of conveyor members disposed within the trough and traveling in an endless path, said conveyor members traveling in said first passage from the exterior of the structure to the inner end of the trough and traveling in said second passage from the inner end of the trough to the exterior of the structure, a first cover plate secured to the foundation and extending partially over said trough, said first cover plate being disposed above said first passage and extending substantially the entire length of said trough, and a second cover plate secured to the foundation and extending partially over said trough, said second cover plate being disposed above the outer end of said second passage and extending from the outer end of the trough to substantially the longitudinal center of said trough with the inner end of the trough being free of a cover to provide an entry to the trough at a location where said conveyor members are moving from the inner end of the trough to the exterior of the structure.

References Cited in the file of this patent

UNITED STATES PATENTS

| | | |
|---|---|---|
| 2,764,320 | Broberg et al. | Sept. 25, 1956 |
| 2,852,110 | Dueringer | Sept. 16, 1958 |